US009762275B2

United States Patent
Yun et al.

(10) Patent No.: US 9,762,275 B2
(45) Date of Patent: Sep. 12, 2017

(54) SUPER-REGENERATIVE RECEIVING METHOD AND SUPER-REGENERATIVE RECEIVER (SRR) CIRCUIT WITH HIGH FREQUENCY SELECTIVITY

(71) Applicant: Samsung Electronics Co., Ltd., Suwon-si (KR)

(72) Inventors: Seok Ju Yun, Hwaseong-si (KR); Seong Joong Kim, Suwon-si (KR); Jae Sup Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 127 days.

(21) Appl. No.: 14/227,590

(22) Filed: Mar. 27, 2014

(65) Prior Publication Data

US 2015/0010120 A1  Jan. 8, 2015

(30) Foreign Application Priority Data

Jul. 3, 2013 (KR) .................. 10-2013-0077874

(51) Int. Cl.
*H04B 1/10* (2006.01)
*H04B 1/28* (2006.01)

(52) U.S. Cl.
CPC ..................... *H04B 1/28* (2013.01)

(58) Field of Classification Search
CPC . H04B 1/24; H04B 1/123; H04B 1/06; H04B 1/109; H03D 11/02; H03D 11/06; H03D 3/00; G01S 7/285; H04W 52/0245; H03K 3/0315; H04L 25/03; H04L 25/08
See application file for complete search history.

(56) References Cited

U.S. PATENT DOCUMENTS

| | | | |
|---|---|---|---|
| 4,695,808 A * | 9/1987 | Cabaniss | H03K 4/06 331/177 R |
| 5,742,902 A | 4/1998 | Shore | |
| 6,215,812 B1 * | 4/2001 | Young | H04B 1/7101 375/144 |
| 6,668,165 B1 | 12/2003 | Cloutier | |

(Continued)

FOREIGN PATENT DOCUMENTS

KR   10-2010-0066717    6/2010

OTHER PUBLICATIONS

R. Gharpurey et al., "Feedforward Interference Cancellation in Narrow-Band Receivers," *Proceedings of the 2006 IEEE Dallas/CAS Workshop on Design, Applications, Integration and Software (DCAS-06)*, 2006, pp. 67-70, paper presented on Oct. 29, 2006, conference held Oct. 29-30, 2006, Richardson, TX.

A. Safarian et al., "Integrated Blocker Filtering RF Front Ends," *2007 IEEE Radio Frequency Integrated Circuits Symposium (RFIC 2007)*, 2007, pp. 13-16, paper presented on Jun. 4, 2007, conference held Jun. 3-5, 2007, Honolulu, HI.

(Continued)

*Primary Examiner* — Daniel Washburn
*Assistant Examiner* — Amneet Singh
(74) *Attorney, Agent, or Firm* — NSIP Law

(57) ABSTRACT

A super-regenerative receiver (SRR) circuit includes an amplifier configured to amplify an input injection signal and output the amplified injection signal to an oscillator; and a feed-forwarding unit configured to feed-forward, to the oscillator, a filtered signal obtained by filtering the injection signal after converting a frequency of the injection signal to another frequency; wherein the oscillator is configured to receive an input of a signal in which the filtered signal is applied to the injection signal.

21 Claims, 18 Drawing Sheets

(56) References Cited

U.S. PATENT DOCUMENTS

| | | | |
|---|---|---|---|
| 2002/0061737 A1* | 5/2002 | Laurens | H03J 1/0008 455/161.1 |
| 2004/0229585 A1 | 11/2004 | Lu et al. | |
| 2005/0069051 A1 | 3/2005 | Lourens | |
| 2005/0127973 A1* | 6/2005 | Wyatt | G06F 1/06 327/238 |
| 2005/0129156 A1 | 6/2005 | Lourens et al. | |
| 2006/0262006 A1 | 11/2006 | Vavik | |
| 2007/0139130 A1 | 6/2007 | Kim et al. | |
| 2007/0264943 A1* | 11/2007 | Darabi | H04B 1/123 455/88 |
| 2009/0156158 A1 | 6/2009 | Kang et al. | |
| 2010/0141319 A1* | 6/2010 | Marutani | H03K 5/06 327/170 |
| 2011/0227664 A1 | 9/2011 | Wyville | |
| 2011/0274141 A1 | 11/2011 | Jantunen et al. | |
| 2011/0280344 A1* | 11/2011 | Ye | H03L 7/0898 375/327 |

OTHER PUBLICATIONS

S. Ayazian et al., "Feedforward Interference Cancellation in Radio Receiver Front-Ends," *IEEE Transactions on Circuits and Systems—II: Express Briefs*, vol. 54, No. 10, Oct. 2007, pp. 902-906.

H. Darabi, "A Blocker Filtering Technique for SAW-Less Wireless Receivers," *IEEE Journal of Solid-State Circuits*, vol. 42, No. 12, Dec. 2007, pp. 2766-2773.

S. Hori et al., "Feedforward Interference Cancellation Architecture for Short-Range Wireless Communication," *IEEE Transactions on Circuits and Systems—II: Express Briefs*, vol. 58, No. 1, Jan. 2011, pp. 16-20.

H. Darabi et al., "Highly Integrated and Tunable RF Front-Ends for Reconfigurable Multiband Transceivers: A Tutorial," *IEEE Transactions on Circuits and Systems—I: Regular Papers*, vol. 58, No. 9, Sep. 2011, pp. 2038-2050.

F. Fernández-Rodríguez et al., "Advanced Quenching Techniques for Super-Regenerative Radio Receivers," *IEEE Transactions on Circuits and Systems—I: Regular Papers*, vol. 59, No. 7, Jul. 2012, pp. 1533-1545.

\* cited by examiner

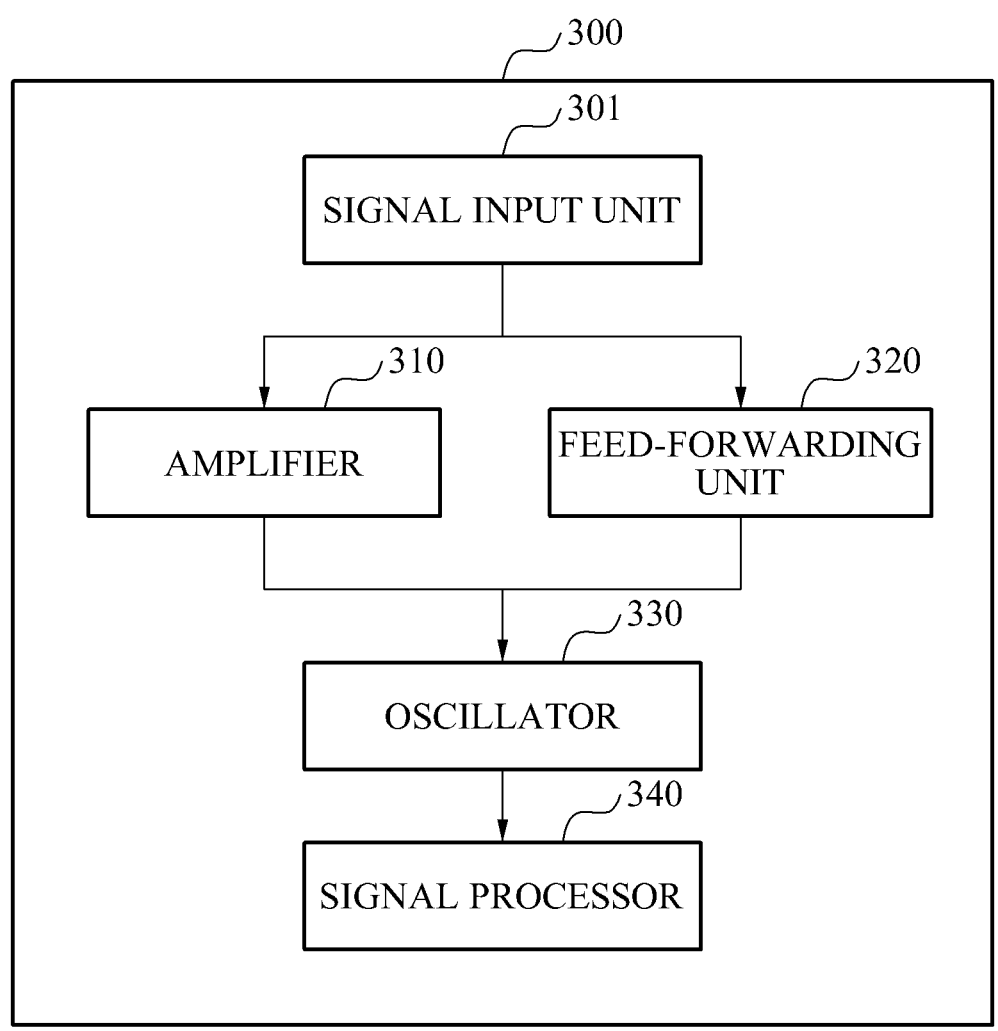

SUPER-REGENERATIVE RECEIVING METHOD AND SUPER-REGENERATIVE RECEIVER (SRR) CIRCUIT WITH HIGH FREQUENCY SELECTIVITY

CROSS-REFERENCE TO RELATED APPLICATIONS

This application claims the benefit under 35 USC 119(a) of Korean Patent Application No. 10-2013-0077874 filed on Jul. 3, 2013, in the Korean Intellectual Property Office, the entire disclosure of which is incorporated herein by reference for all purposes.

BACKGROUND

1. Field

The following description relates to a super-regenerative receiving apparatus and method.

2. Description of Related Art

A super-regenerative receiver (SRR) has a receiving sensitivity, and may be implemented readily at a low cost. The SRR may be applied to a wide range of fields, for example, remote control toys, information systems, and monitoring devices.

The SRR detects a signal based on a start-up time of an oscillator. The start-up time of the oscillator varies depending on a frequency and an intensity of a signal received by an antenna. The oscillator may oscillate very slowly due to thermal noise even though an input signal is not provided.

Conventional SRRs may be classified into two types, a general SRR that samples an input signal more than twice, and a synchronous SRR that samples an input signal once.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a super-regenerative receiver (SRR) circuit includes an amplifier configured to amplify an input injection signal and output the amplified injection signal to an oscillator; and a feed-forwarding unit configured to feed-forward, to the oscillator, a filtered signal obtained by filtering the injection signal after converting a frequency of the injection signal to another frequency; wherein the oscillator is configured to receive an input of a signal in which the filtered signal is applied to the injection signal.

The feed-forwarding unit may include a first frequency converter configured to convert a predetermined first frequency of the injection signal to a predetermined second frequency; a filtering unit configured to filter the injection signal having the predetermined second frequency; and a second frequency converter configured to convert a frequency of the filtered injection signal to the predetermined first frequency to obtain the filtered signal.

The predetermined second frequency may be lower than the predetermined first frequency.

The filtering unit may include a band-rejection filter configured to remove a signal of a predetermined frequency band from the injection signal having the predetermined second frequency; and the oscillator may be further configured to receive, as the input, a signal in which the filtered signal is subtracted from the injection signal.

The filtering unit may include a band-pass filter configured to pass a signal of a predetermined frequency band in the injection signal having the predetermined second frequency; and the oscillator may be configured to receive, as the input, a signal in which the filtered signal is added to the injection signal.

The feed-forwarding unit may be further configured to convert the frequency of the injection signal to the other frequency using a local oscillator (LO) signal.

The feed-forwarding unit may be further configured to convert the frequency of the injection signal to the other frequency using an oscillation signal of the oscillator.

The oscillator may include a phase delay unit configured to delay, for a predetermined time, an oscillation signal of the oscillator to obtain a delayed oscillation signal; and the feed-forwarding unit may be further configured to convert the frequency of the injection signal to the other frequency using the delayed oscillation signal.

The SRR circuit may further include an interference signal discriminator configured to sense interference in the injection signal, and activate the feed-forwarding unit in response to a value of the interference being greater than a predetermined value.

The feed-forwarding unit may include an in-phase feed-forwarding unit configured to feed-forward, to the oscillator, a filtered in-phase component signal obtained by filtering an in-phase component signal of the injection signal after converting a frequency of the in-phase component signal of the injection signal to another frequency; and a quadrature feed-forwarding unit configured to feed-forward, to the oscillator, a filtered quadrature component signal obtained by filtering a quadrature component signal of the injection signal after converting a frequency of the quadrature component signal of the injection signal to another frequency; wherein the oscillator may be further configured to receive, as the input, a signal in which the filtered in-phase component signal and the filtered quadrature component signal are applied to the injection signal, and output an in-phase output signal and a quadrature output signal.

In another general aspect, a super-regenerative receiving method includes amplifying an input injection signal; feed-forwarding a filtered signal obtained by filtering the injection signal after converting a frequency of the injection signal to another frequency; and oscillating in response to an input of a signal in which the filtered signal is applied to the injection signal.

The feed-forwarding may include converting a predetermined first frequency of the injection signal to a predetermined second frequency; filtering the injection signal having the predetermined second frequency; and converting a frequency of the filtered injection signal to the predetermined first frequency to obtain the filtered signal.

The predetermined second frequency may be lower than the predetermined first frequency.

The feed-forwarding may include removing a signal of a predetermined frequency band from the injection signal having the predetermined second frequency; and the oscillating may include receiving, as the input, a signal in which the filtered signal is subtracted from the injection signal.

The feed-forwarding may include passing a signal of a predetermined frequency band in the injection signal having the predetermined second frequency; and the oscillating may include receiving, as the input, a signal in which the filtered signal is added to the injection signal.

The oscillating may include delaying, for a predetermined time, an oscillation signal of the oscillating to obtain a delayed oscillation signal; and the feed-forwarding may include converting the frequency of the injection signal to the other frequency using the delayed oscillation signal.

The feed-forwarding may include sensing interference in the injection signal; and the feed-forwarding of the filtered signal may be performed in response to a value of the interference being greater than a predetermined value.

The feed-forwarding may include feed-forwarding a filtered in-phase component signal obtained by filtering an in-phase component signal of the injection signal after converting a frequency of the in-phase component signal of the injection signal to another frequency; and feed-forwarding a quadrature component signal obtained by filtering a quadrature component signal of the injection signal after converting a frequency of the in-phase component signal of the injection signal to another frequency; and the oscillating may include receiving, as the input, a signal in which the filtered in-phase component signal and filtered quadrature component signal are applied to the injection signal; and outputting an in-phase output signal and a quadrature output signal.

In another general aspect, a super-regenerative receiver (SRR) circuit includes an amplifier configured to amplify an input injection signal and output the amplified injection signal to an oscillator; wherein the oscillator is configured to generate a harmonic signal having a harmonic frequency equal to 1/N times a frequency of the injection signal, and oscillate at a frequency N times greater than the harmonic frequency to enable the injection signal to be received.

The oscillator includes an LC filter configured to resonate at an N-th harmonic frequency to achieve the oscillating at the frequency N times greater than the harmonic frequency.

In another general aspect, a super-regenerative receiver (SRR) circuit includes an amplifier configured to amplify an input injection signal to obtain an amplified injection signal; a feed-forwarding unit configured to filter the injection signal at a frequency different from a frequency of the injection signal to obtain a filtered signal; and an application unit configured to apply the filtered signal to the amplified injection signal to obtain a combined signal, and output the combined signal to an oscillator.

The amplifier may include the application unit.

The feed-forwarding unit may be further configured to filter the injection signal at a frequency lower than the frequency of the injection signal, and output the filtered injection signal at a frequency equal to the frequency of the injection signal.

Other features and aspects will be apparent from the following detailed description, the drawings, and the claims.

BRIEF DESCRIPTION OF THE DRAWINGS

FIG. 3 illustrates an example of a configuration of an SRR.

DETAILED DESCRIPTION

Figure 1:
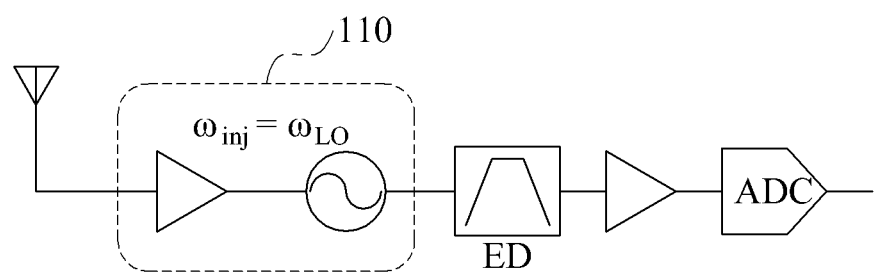
FIG. 1 illustrates an example of a configuration of a super-regenerative receiver (SRR) according to a conventional art.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, description of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

A super-regenerative oscillation structure may receive a signal input in a radio frequency (RF) band, and oscillate the input signal passing through a low-noise amplifier (LNA) using a super-regenerative gain. A frequency of a super-regenerative oscillator (SRO) obtaining the super-regenerative gain may be controlled to be equal to a frequency of the input signal, and locked to the signal input through a front-end amplifier.

An input frequency locking range of a super-regenerative receiver (SRR) may be expressed by Equation 1 below.

$$f_{lock} = \frac{\omega_o I_{inj}}{2QI_{osc}\sqrt{1 - \frac{I_{osc}^2}{I_{inj}^2}}} \quad (1)$$

In Equation 1, Q denotes a value of a quality factor of an LC oscillator included in the SRR, $I_{inj}$ denotes a level of a signal current to be input, $I_{osc}$ denotes an oscillation signal current of the oscillator, and $\omega_o$ denotes an operation frequency of the oscillator.

As can be seen from Equation 1, the input frequency locking range of the SRR is inversely proportional to a Q value of the oscillator. In a case in which a received frequency is almost equal to an oscillation frequency of the oscillator, a constant locking range may be obtained when $I_{inj}$ increases as the Q value increases. As the Q value of the oscillator increases, increasing a receiving sensitivity may be difficult. In addition, in order to increase a frequency selectivity of the SRR, increasing the Q value of the oscillator acting as a filter may be necessary. Since the oscillator may oscillate at a frequency equal to an RF frequency of a carrier wave, there may be constraints on increasing the Q value.

The SRR has an excellent receiving sensitivity due to a high RF gain characteristic, and may be operated using low power. However, since the SRR may perform filtering in an RF band, a frequency selectivity may not be relatively high. Due to such a frequency selectivity characteristic, a signal received by the SRR in the RF band may be degraded by an interference signal component existing in a proximate frequency band or an adjacent channel.

In one example, a frequency selectivity of a transceiver having a super-regenerative oscillation structure may be increased while maintaining characteristics of low power consumption and high receiving sensitivity. The frequency selectivity may be increased by applying feed-forwarding before an oscillator in an SRR of FIG. 1. In addition, an output signal of the oscillator included in the SRR may be used as a local oscillation (LO) signal of each frequency converter included in a feed-forwarding unit.

In one example, a complexity of the SRR may be minimized while a frequency selectivity of the SRR is increased through feed-forwarding as described above. For example, a frequency selectivity of the super-regenerative oscillation structure may be increased using a feed-forward RF chain in the SRR. In this example, the SRR may minimize an effect of an adjacent interference signal while preventing degradation of receiving sensitivity, and thus provide a stable low-noise performance.

FIG. 1 illustrates an example of a configuration of an SRR 110 according to a conventional art. The SRR 110 may receive a signal by controlling a voltage-controlled oscillator based on an input provided through an operational amplifier, for example, an LNA. Since a signal received in an RF band may be sensed using an output signal of the oscillator having a frequency equal to a frequency of the received signal, a frequency selectivity of the SRR 110 may be proportional to a frequency response of a resonance unit of the oscillator.

Since a Q value of the resonance unit in an RF band may be relatively low, a channel frequency selectivity may be low in such a receiving scheme. For example, since a frequency response characteristic of a filter may be moderate, the signal received in the RF band may be easily degraded by an interference signal around the RF band.

Although a Q value of the oscillator may be increased or a filter may be disposed at a front end of the SRR 110 in order to increase a frequency selectivity, technical implementation of a high Q value of an on-chip circuit in the RF band may be difficult in the SRR 110. In addition, although a demand exists for a technology for increasing a frequency selectivity by increasing quenching of the SRR 110, in general, use of additional circuits may increase, and thus a complexity of the SRR 110 may increase.

In one example, the SRR 110 according to the conventional art may be improved as described herein by adding a signal transfer path to the super-regenerative oscillation structure. An RF frequency may be converted to a direct current (DC) frequency band or an intermediate frequency band using frequency downconversion, and a frequency of a converted signal may be converted to the RF frequency band using frequency upconversion through a filter. A relevant detailed description will be provided hereinafter.

When a frequency of an input signal is converted, for example, when filtering is performed on the input signal at a relatively low frequency and conversion to an original frequency is performed, a relatively high frequency selectivity may be obtained. The upconverted signal having the original frequency may be added to or subtracted from the input signal, and thus the signal may be represented in an RF band with a high frequency selectivity similar to a frequency selectivity in a base band. The signal of the RF band with the high frequency selectivity may be input into the oscillator of the SRR 110 improved as described herein. As described above, a frequency selectivity of the SRR 110 improved as described herein may increase.

The SRR 110 improved as described herein may be used for an RF integrated circuit (RFIC), a super-regenerative receiver/oscillator (SRR/O), an ultra low power (ULP) transceiver, an application, a low power RFIC solution, a ULP radio, a wireless local area network (WLAN), Bluetooth, Zigbee, and any other application in which any one or any combination of low power, high sensitivity, and high frequency selectivity are needed.

Figure 2A:
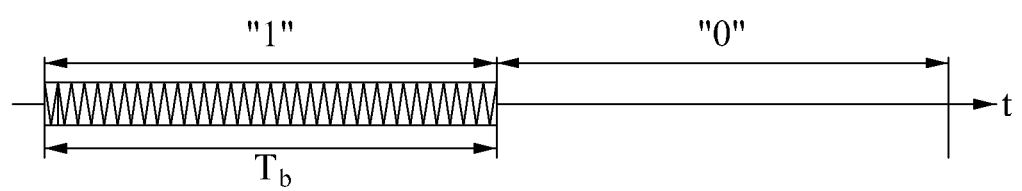
FIGS. 2A through 2D illustrate examples of an input signal and an output signal of an SRR.
Figure 2B:
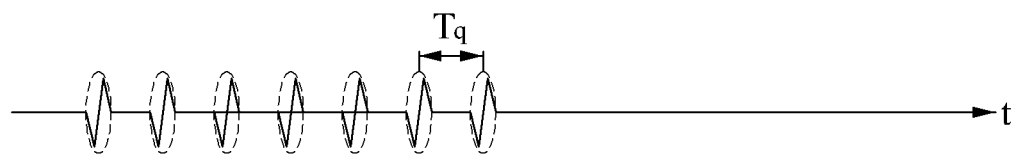

FIGS. 2A through 2B illustrate examples of an input signal and an output signal of an SRR.

FIG. 2A illustrates an example of an interval indicating "1" for a predetermined period, for example, $T_b$, and an interval indicating "0" for a predetermined period in the input signal of the SRR. For example, a signal may oscillate in the interval indicating "1", and a signal may not oscillate in the interval indicating "0".

Referring to FIG. 2B, in an example as shown through envelope detection (ED), a signal may oscillate at predetermined intervals, for example, intervals of $T_q$, in an interval indicating "1" in the output signal of the SRR.

Figure 2C:
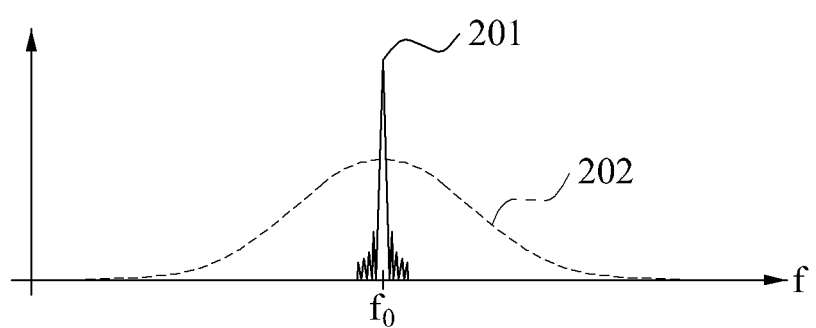

FIG. 2C illustrates an example of a spectrum 201 of the input signal of the SRR and a frequency response 202 of the SRR. Since the frequency response 202 of the SRR is relatively broad as shown in FIG. 2C, the SRR 110 according to the conventional art of FIG. 1 may be greatly affected by an interference signal around an RF band.

Figure 2D:
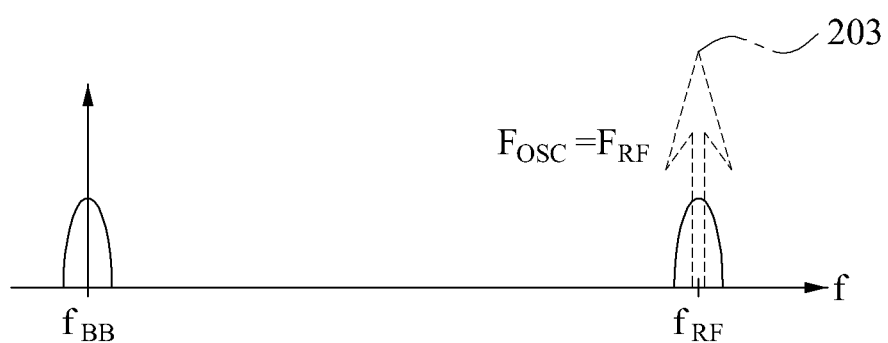

FIG. 2D illustrates an oscillation frequency $F_{OSC}$ of the SRR and a frequency $F_{RF}$ in an RF band. A frequency of an input signal 203 may be equal to a frequency of the RF band greater than a frequency $F_{BB}$ of a base band.

FIG. 3 illustrates an example of a configuration of an SRR 300. The SRR 300 includes an SRR circuit including, for example, a signal input unit 301, an amplifier 310, a feed-forwarding unit 320, an oscillator 330, and a signal processor 340.

The signal input unit 301 receives an input of an injection signal. The injection signal may include a frequency of an RF band.

The amplifier 310 amplifies the input injection signal and outputs the amplified injection signal to the oscillator 330. The amplifier 310 may include an operational amplifier.

The feed-forwarding unit 320 feeds forward, to the oscillator 330, a signal filtered after converting a frequency of the injection signal to another frequency. A process of feed-forwarding the injection signal will be described in detail with reference to FIG. 4.

The oscillator 330 receives a signal in which the filtered signal is applied to the injection signal. Depending on a scheme of filtering the injection signal by the feed-forwarding unit 320, the oscillator 330 may receive a signal in which the filtered signal is added to or subtracted from the injection signal. The oscillator 330 generates an oscillation signal based on the injection signal to which the filtered signal is applied.

The signal processor 340 processes the oscillation signal output from the oscillator 330 to generate an output signal. For example, the signal processor 340 may perform envelope detection (ED) and analog-to-digital conversion (ADC) to generate the output signal in a digital format.

FIGS. 4 through 10 illustrate examples of configurations of an SRR.

Figure 4:
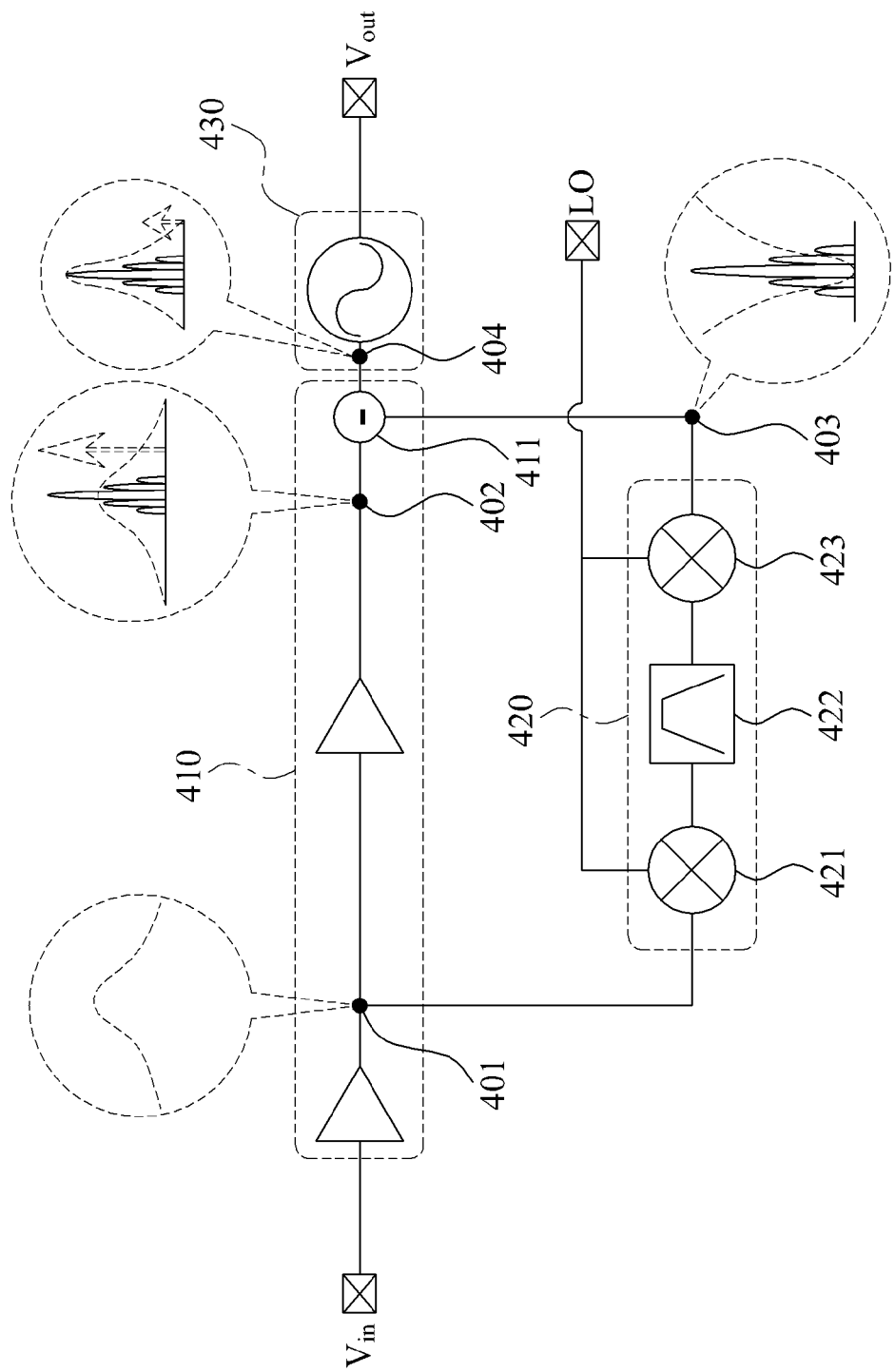
FIGS. 4 through 10 illustrate examples of configurations of an SRR.

FIG. 4 illustrates an example of a basic configuration of an SRR. Referring to FIG. 4, an amplifier 410 amplifies an injection signal input in an RF band, and outputs the amplified injection signal to an oscillator 430. A node 401 through which the injection signal is input may have a response characteristic of the RF band as shown in FIG. 4. The amplifier 410 includes an application unit 411 configured to apply a filtered signal to the injection signal. At a node 402 through which the injection signal is output to the oscillator 430, the injection signal and an interference signal may be relatively great as shown in FIG. 4 due to a modest response characteristic. For example, an intensity of the interference signal may be represented by a size of an arrow shown in FIG. 4.

A feed-forwarding unit 420 converts a frequency of the injection signal input in the RF band to another frequency, filters the converted signal, converts a frequency of the filtered signal to the original frequency of the RF band, and feeds forward the signal of the original frequency to the oscillator 430. The feed-forwarding unit 420 includes a first frequency converter 421 configured to convert a predetermined first frequency of the injection signal to a predetermined second frequency, a filtering unit 422 configured to filter the injection signal of the predetermined second frequency, and a second frequency converter 423 configured to convert a frequency of the filtered injection signal to the predetermined first frequency. At a node 403 through which the feed-forwarding unit 420 outputs the injection signal to the oscillator 430, a band-rejection filter may be applied to the injection signal.

For example, the predetermined second frequency may be lower than the predetermined first frequency. The predetermined second frequency may have a characteristic similar to a characteristic of a base band when compared to the predetermined first frequency. Accordingly, when the injection signal of the predetermined second frequency is filtered, a frequency selectivity characteristic of the base band may be reflected in the filtered injection signal. Although a frequency of the filtered injection signal is converted to the predetermined first frequency, for example, a frequency of an RF band, a high frequency selectivity may be maintained.

For example, the filtering unit 422 may include a band-rejection filter configured to remove a signal of a predetermined frequency band from the injection signal of the predetermined second frequency, or a band-pass filter configured to pass a signal of a predetermined frequency band in the injection signal of the predetermined second frequency.

The first frequency converter 421 performs frequency downconversion with respect to the injection signal. The filtering unit 422 filters the frequency-downconverted injection signal. The second frequency converter 423 performs frequency upconversion with respect to the filtered injection signal, and feeds forward the filtered injection signal to the oscillator 430. In this example, the feed-forwarding unit 420 applies the filtered signal to the injection signal via the application unit 411. For example, when the filtering unit 422 filters the injection signal using the band-rejection filter, the application unit 411 may subtract the filtered signal from the injection signal. When the filtering unit 422 filters the injection signal using the band-pass filter, the oscillator 430 may add the filtered signal to the injection signal.

In order to enable the first frequency converter 421 and the second frequency converter 423 to perform frequency conversion, an oscillation signal may be input. For example, the first frequency converter 421 and the second frequency converter 423 may receive a local oscillator (LO) signal, and perform frequency conversion using the LO signal.

The oscillator 430 receives the injection signal to which the filtered signal is applied as described above. As shown at an input node 404 of the oscillator 430, the input injection signal may include a signal having a high frequency selectivity in a form in which an interference signal is reduced and a response characteristic is relatively steep. For example, the intensity of the interference signal represented by a size of an arrow may be reduced.

Figure 5:
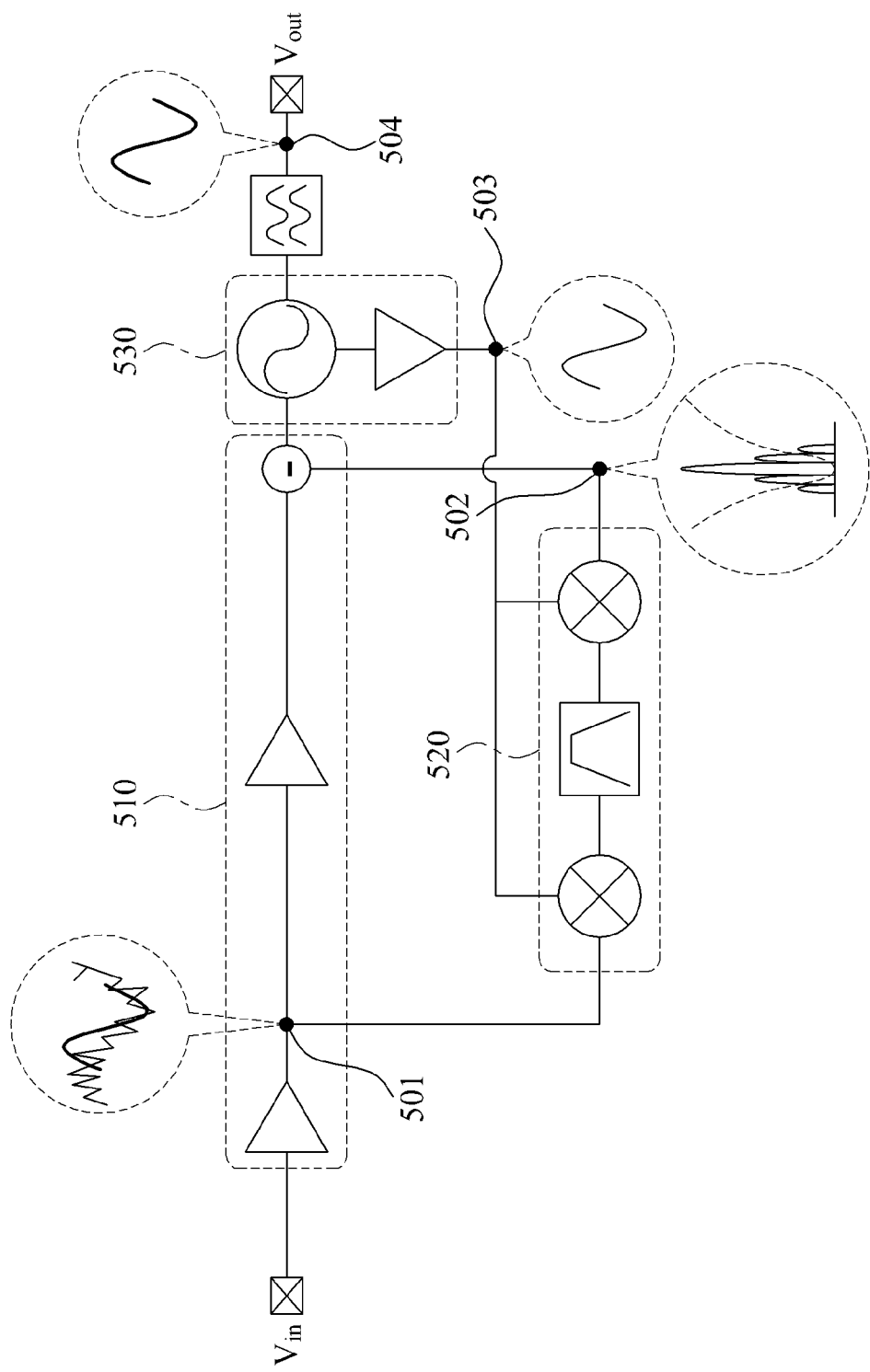

FIG. 5 illustrates an example of an SRR in which a buffer is added to an oscillator 530. An amplifier 510 is the same as the amplifier 410 of FIG. 4.

A feed-forwarding unit 520 performs frequency conversion similar to the feed-forwarding unit 420 of FIG. 4. The feed-forwarding unit 520 uses an output signal of the oscillator 530 as an LO signal to perform the frequency conversion. The SRR may use the output signal of the oscillator 530 as an LO signal of the feed-forwarding unit 520 since a frequency of an injection signal input in an RF band is equal to a frequency of the LO signal, thereby reducing a complexity of the SRR by avoiding the need to provide a separate LO to generate the LO signal.

The oscillator 530 provides the output signal to the feed-forwarding unit 520 through the buffer. Since the oscillator 530 includes the buffer, an output of the oscillator 530 may be separated from an input of the feed-forwarding unit 520, and an LO signal having a stable waveform may be provided.

At a node 501 through which an injection signal is input, the injection signal and an interference signal are superimposed as shown in FIG. 5. Similar to the description provided with reference to FIG. 4, at a feed-forward node 502, a band-rejection filter may be applied to the injection signal. At a buffer node 503 included in the oscillator 530, an output signal of the oscillator 530 is illustrated. At an output node 504, an output signal having a form in which the interference signal has been removed from the injection signal is shown.

Figure 6:
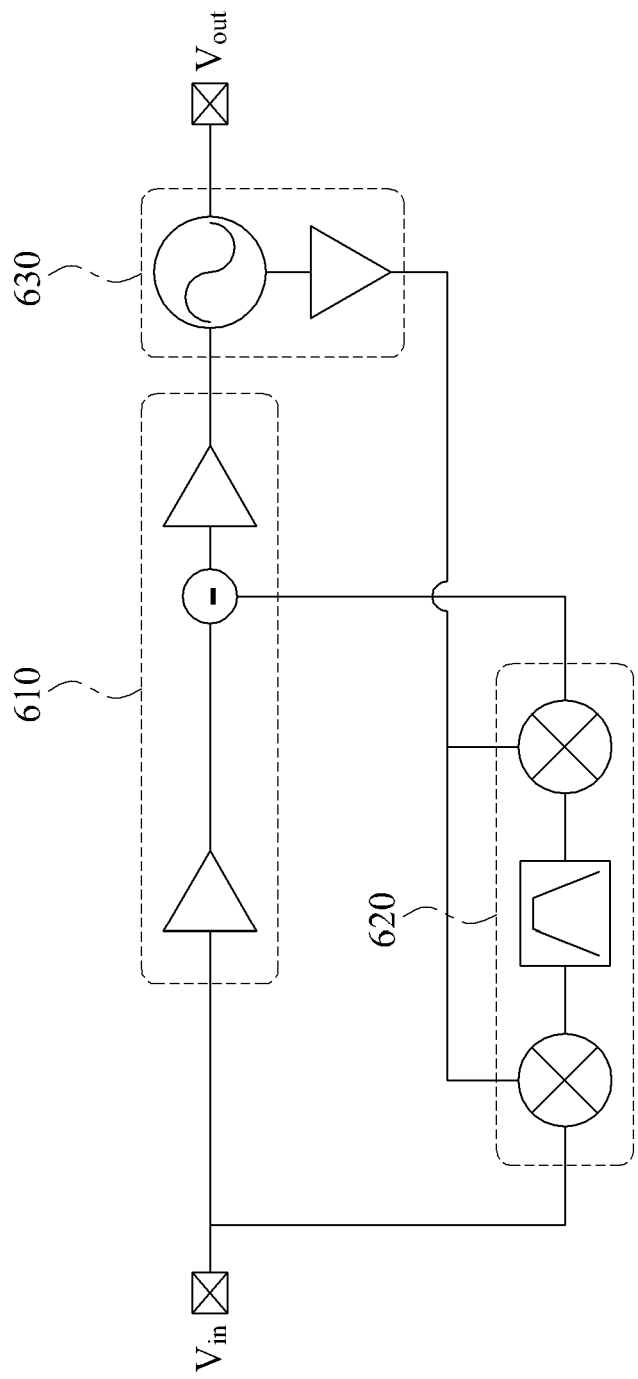

FIG. 6 illustrates an example of an SRR in which a buffer is added to an amplifier 610. A feed-forwarding unit 620 and an oscillator 630 are the same as the feed-forwarding unit 520 and the oscillator 530 of FIG. 5.

In contrast to the amplifier 410 of FIG. 4, the amplifier 610 may be implemented such that a node through which an injection signal input in an RF band is input into the feed-forwarding unit 620 is directly connected to an input node of the amplifier 610. Accordingly, input matching may be performed simultaneously at an input node of the feed-forwarding unit 620, and thus the SRR may be implemented with a simpler structure.

In the example of FIG. 6, the buffer is added to the amplifier 610 before an input node of the oscillator 630 to separate the oscillator 630 from the amplifier 610 and the feed-forwarding unit 620. Accordingly, a waveform at each node may be separated, and thus a circuit may operate stably.

Figure 7A:
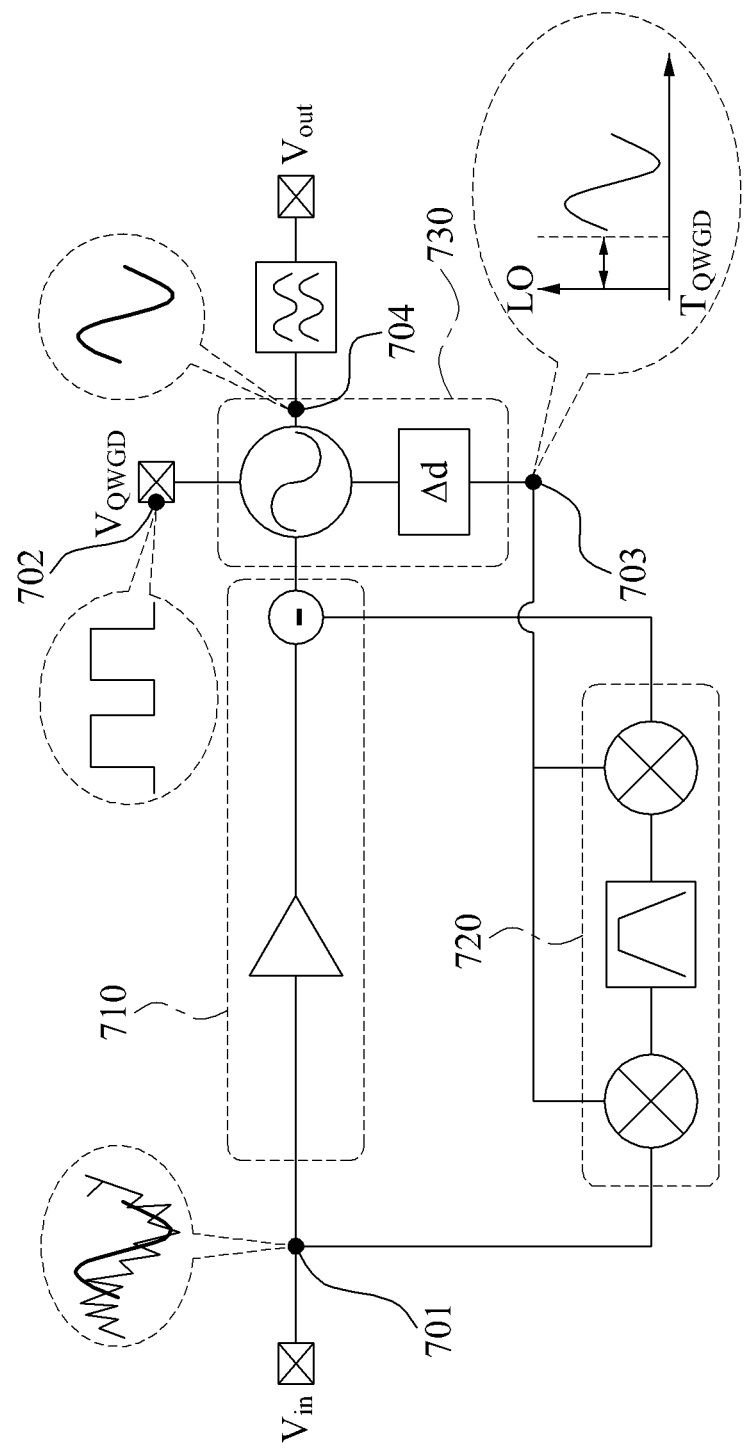

FIG. 7A illustrates an example of an SRR in which a phase delay unit is added to an oscillator 730. An amplifier 710 and a feed-forwarding unit 720 are similar to the amplifier 610 and the feed-forwarding unit 620 of FIG. 6, except that the buffer added to the amplifier 610 as described above is omitted from the amplifier 710, and, thus repeated descriptions will be omitted here for conciseness.

When an output signal of the oscillator 730 is used as an LO signal of each frequency converter included in the feed-forwarding unit 720 without the phase delay unit as in the SRR of FIGS. 5 and 6, an operation timing of a filtering unit included in the feed-forwarding unit 720 may be delayed with respect to an oscillation timing of the oscillator 730. Due to such a timing delay, the oscillator 730 may not normally receive an input of a signal filtered by the feed-forwarding unit 720.

In the example of FIG. 7A, a phase delay unit configured to delay an output signal of the oscillator 730 for a predetermined time, for example, $\Delta t = 1/f_{QWGD}$, is added to the oscillator 730 in the SRR. By providing the feed-forwarding unit 720 with the output signal of the oscillator 730 to which a phase delay is applied, the operation timing of the filtering unit may be maintained to be identical to the oscillation timing of the oscillator 730.

At a node 701 through which an injection signal is input, the injection signal and an interference signal are superimposed as shown in FIG. 7. At a node 702 of the oscillator 730, a clock $V_{QWGD}$ that periodically turns the oscillator 730 on and off to quench the oscillation of the oscillator 730 is shown. At a node 703 of the phase delay unit, an output signal of the oscillator 730 delayed for a predetermined time, for example, $T_{QWGD}$, is shown. At an output node 704 of the oscillator 730, an output signal of the oscillator 730 having a form in which the interference signal has been removed from the injection signal is shown.

Figure 7B:
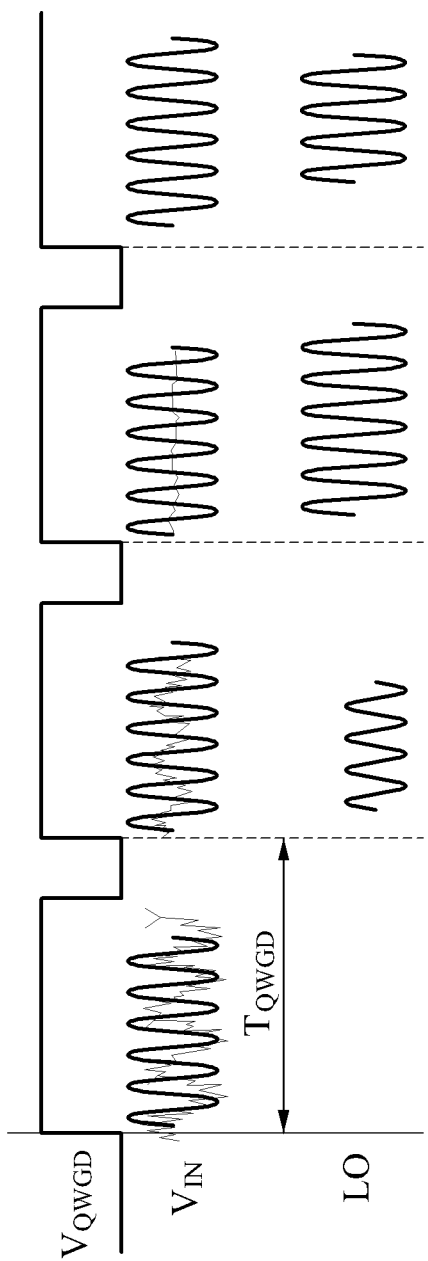

FIG. 7B illustrates an example of the clock $V_{QWGD}$ that periodically turns the oscillator 730 on and off, an injection signal $V_{IN}$, and an LO signal input into the feed-forwarding unit 720 in FIG. 7A.

As shown in FIG. 7B, the injection signal $V_{IN}$ may be input along with an interference signal. The SRR may remove the interference signal from the injection signal over time. For example, when the phase delay unit is added, the interference signal around an RF band in which the injection signal is located may be removed after a quenching signal of a number of periods, for example, a single period, is oscillated by the oscillator 730.

The LO signal is an output signal of the oscillator 730 of which a phase is delayed, and may be delayed for a predetermined time, for example, $T_{QWGD}$. As shown in FIG. 7B, although a waveform may be abnormal in an initial operation after the delay is applied, a normal operation may resume after a number of periods, for example, a single period, has elapsed.

Figure 8:
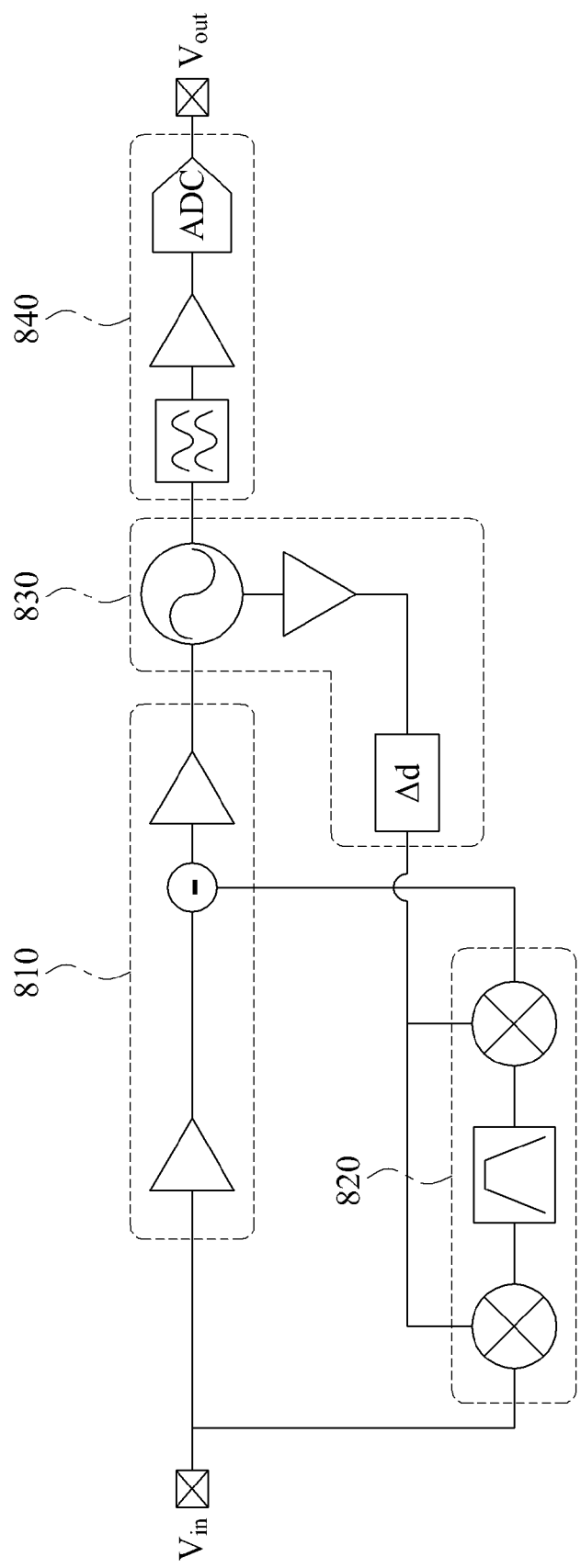

FIG. 8 illustrates an example of an SRR in which a signal processor 840 is added after an oscillator 830. An amplifier 810 is the same as the amplifier 610 of FIG. 6, and a feed-forwarding unit 820 and the oscillator 830 are similar to the feed-forwarding unit 720 and the oscillator 730 of FIG. 7, except that a buffer is added to the oscillator 830 before the phase delay unit and, thus repeated descriptions will be omitted here for conciseness.

In the example of FIG. 8, a frequency selectivity of an injection signal input in an RF band may be increased by the feed-forwarding unit 820. An output signal of the oscillator 830 may be processed by the signal processor 840 and transferred to a digital processor. For example, the signal processor 840 may include a base band circuit block.

The signal processor 840 may include a block configured to perform an ED function, an amplification function, and an ADC function.

Figure 9:
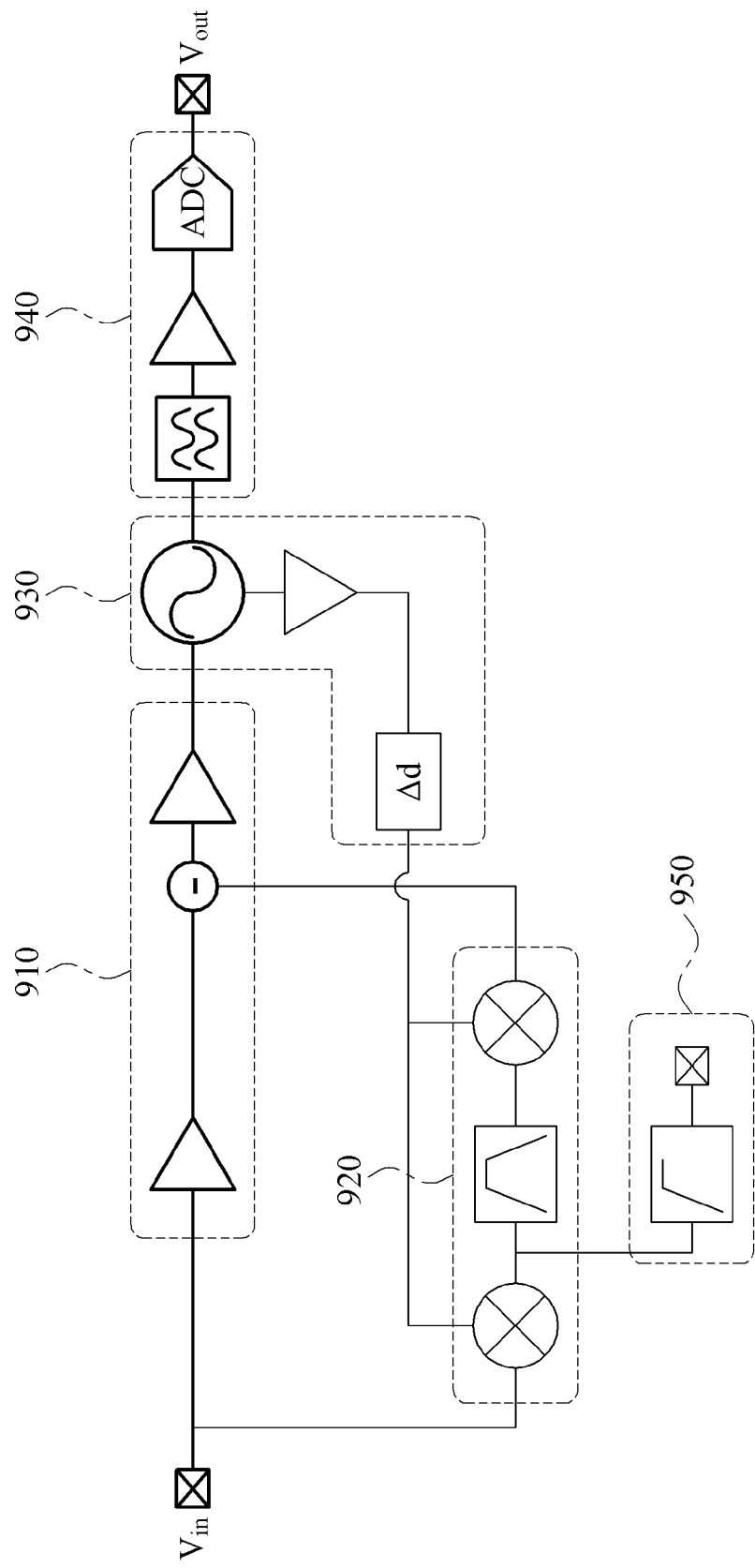

FIG. 9 illustrates an example of an SRR in which an interference signal discriminator 950 is added. An amplifier 910, a feed-forwarding unit 920, an oscillator 930, and a signal processor 940 are the same as the amplifier 810, the feeding-forwarding unit 820, the oscillator 830, and the signal processor 840 of FIG. 8, and thus repeated descriptions will be omitted here for conciseness.

In the example of FIG. 9, the interference signal discriminator 950 senses interference in an injection signal, and activates the feed-forwarding unit 920 when a value of the interference is greater than a predetermined value. The interference signal discriminator 950 may include a high-pass filter configured to sense an interference signal having a frequency higher than a frequency of an injection signal. For example, the predetermined value may be a value of an intensity of the interference signal that precludes the SRR of FIG. 1 from processing the injection signal normally.

When the value of the interference signal is less than or equal to the predetermined value, or when an interference signal is absent, the SRR according to the example of FIG. 9 may be operated without the feed-forwarding unit 920 operating, resulting in a configuration similar to the SRR 110 of FIG. 1. For example, the injection signal may be processed by the amplifier 910 and the oscillator 930 without feed-forwarding, and output by the signal processor 940 as a digital signal.

Figure 10:
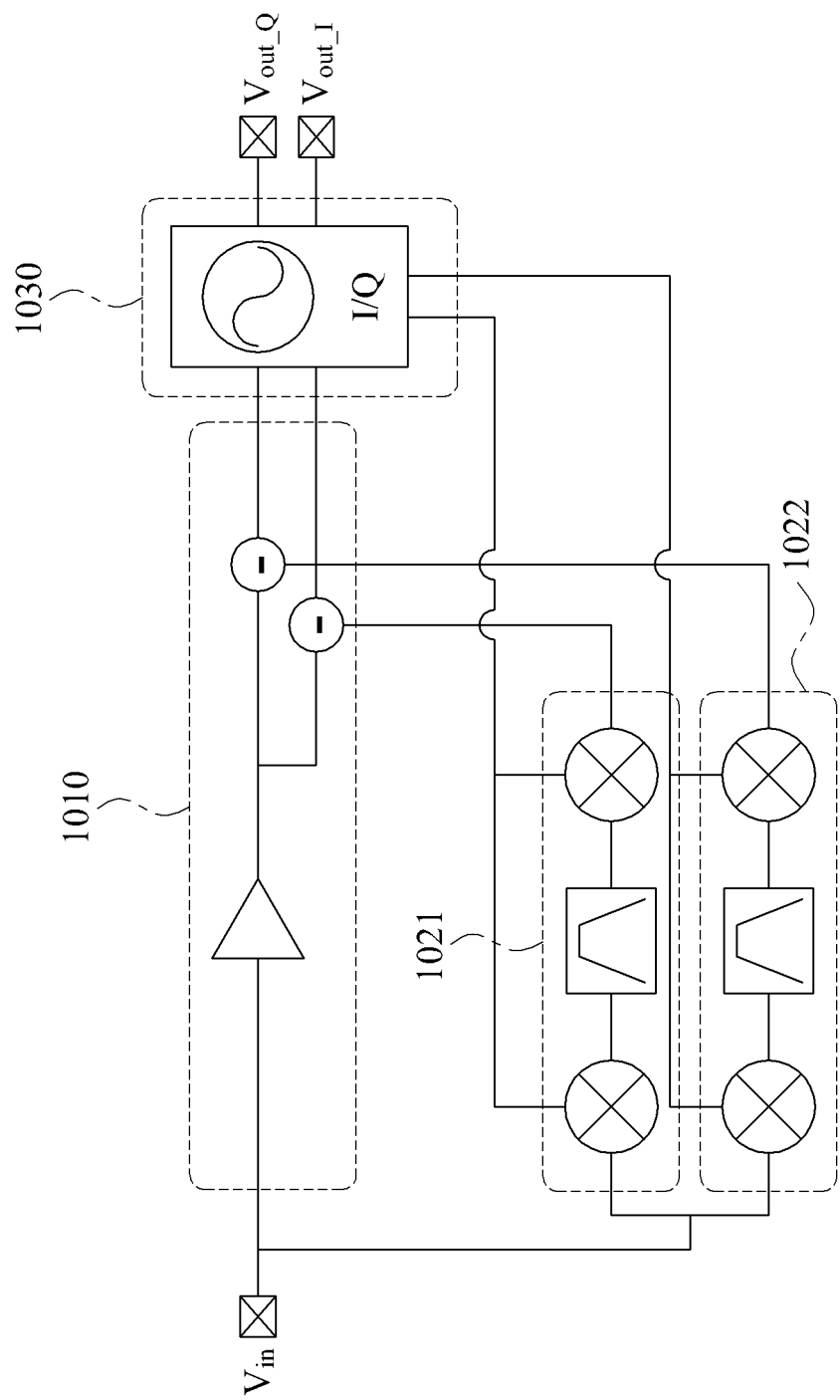

FIG. 10 illustrates an example of an SRR for receiving in-phase/quadrature (I/Q) modulated injection signal. A feed-forwarding unit includes an in-phase feed-forwarding unit 1021 configured to feed-forward, to an oscillator 1030, a filtered in-phase component signal obtained by filtering an in-phase component signal of the injection signal after converting a frequency of the in-phase component signal of the injection signal to another frequency, and a quadrature feed-forwarding unit 1022 configured to feed-forward, to the oscillator 1030, a filtered quadrature component signal obtained by filtering a quadrature component signal of the injection signal after converting a frequency of the quadrature component signal of the injection signal to another frequency.

The oscillator 1030 receives, as an input, a signal in which the filtered in-phase component signal and the filtered quadrature component signal are applied to the injection signal, and outputs an in-phase output signal and a quadrature output signal.

In the example of FIG. 10, an injection signal passing through an amplifier 1010 may output the in-phase output signal and the quadrature output signal in response to each of the filtered in-phase component signal and the filtered quadrature component signal. Herein, the SRR of FIG. 10 oscillates an I/Q phase. By separating frequency conversion and filtering of the in-phase component signal and the quadrature component signal as described above, a phase of the oscillator 1030 may be diversified and a data rate of a signal to be processed by the SRR may increase.

Figure 11A:
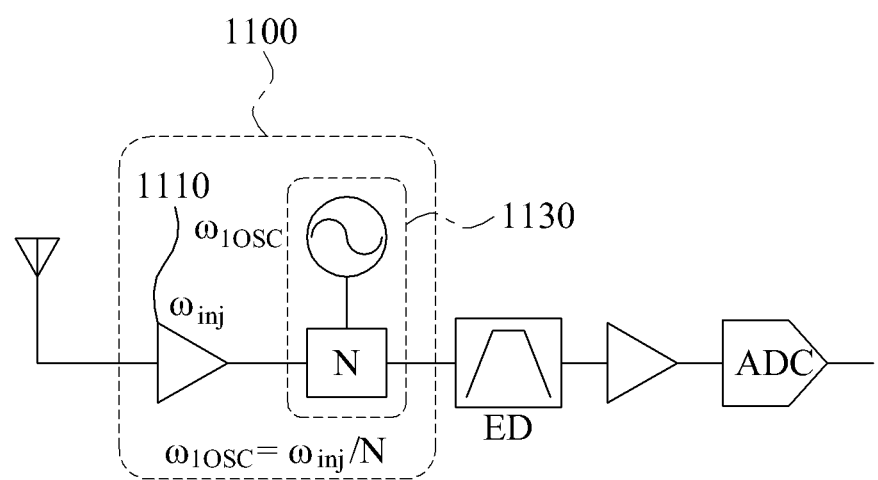
FIGS. 11A and 11B illustrate an example of a configuration of an SRR configured to oscillate at a frequency N times greater than a harmonic frequency.
Figure 11B:
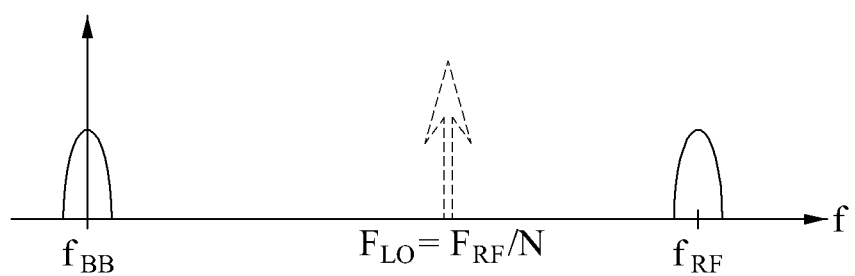

FIGS. 11A and 11B illustrate an example of a configuration of an SRR 1100 configured to oscillate at a frequency N times greater than a harmonic frequency. As shown in FIG. 11A, an amplifier 1110 amplifies an input injection signal and outputs the amplified injection signal to an oscillator 1130.

An operation frequency of the oscillator 1130 may be an N-th sub-harmonic frequency of an input frequency in the SRR, that is, a frequency 1/N times the input frequency, according to the following Equation 2.

$$f_{OSC} = \frac{f_{inj}}{N} \qquad (2)$$

In Equation 2, $f_{OSC}$ denotes an oscillation frequency of the oscillator 1130 measured in hertz (Hz), and $f_{inj}$ denotes an input frequency of the oscillator 1130 measured in Hz. Alternatively, $\omega_{1OSC}$ may denote an oscillation frequency of the oscillator 1130 measured in radians per second (rad/s), and $\omega_{inj}$ may denote an input frequency of the oscillator 1130 measured in rad/s. Since the oscillation frequency is equal to 1/N of the input frequency of the oscillator 1130, the SRR 1100 operates at a frequency lower than an RF frequency, and a frequency selectivity of the SRR 1100 increases. Since the SRR 1100 may use a harmonic frequency 1/N times the input frequency as an oscillation frequency, an isolation between an RF end and an LO end may increase.

As shown in FIG. 11B, the oscillator 1130 of FIG. 11A generates a harmonic signal having a harmonic frequency $F_{LO}$ equal to 1/N times a frequency $f_{RF}$ of the injection signal, and oscillates at a frequency N times greater than the harmonic frequency to enable the injection signal to be received. For example, the oscillating at the frequency N times greater than the harmonic frequency may be achieved through an LC filter configured to resonate at an N-th harmonic frequency. N denotes an integer greater than or equal to 2.

The SRR 1100 in which the operation frequency of the oscillator 1130 is implemented using the N-th sub-harmonic frequency of the input frequency may be referred to as a harmonic SRR. The injection signal input in the RF band may be received in response to a signal having the frequency N times greater than the harmonic frequency generated by the oscillator 1130. The signal having the frequency N times greater than the harmonic frequency may be generated through a circuit of FIG. 12.

Figure 12:
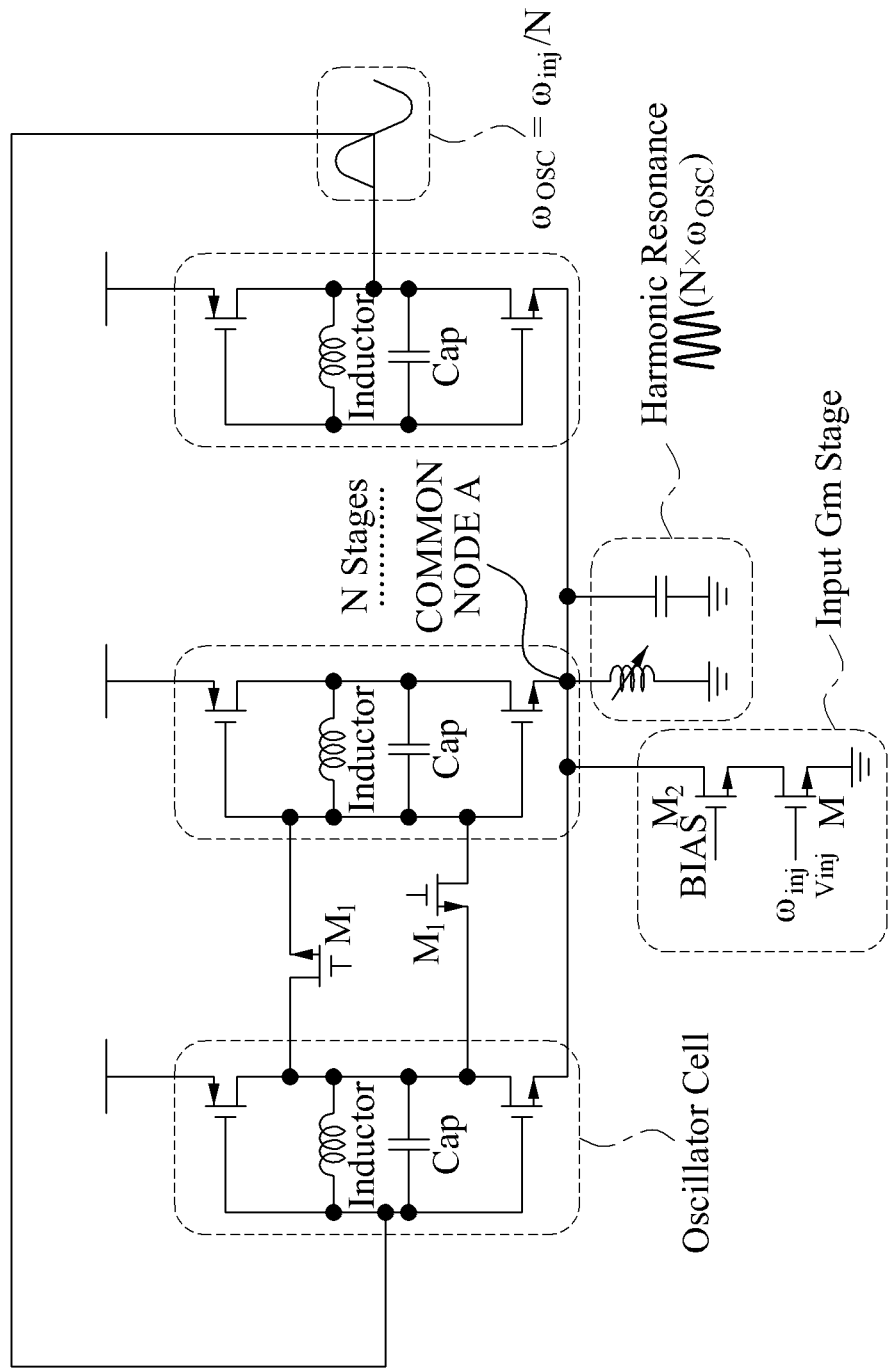
FIG. 12 illustrates an example of a circuit in which an SRR generates a signal having a frequency N times greater than a harmonic frequency.

FIG. 12 illustrates an example of a circuit in which an SRR generates a signal having a frequency N times greater than a harmonic frequency. Since a common source voltage at a differential oscillator included in a harmonic SRR in this example may be used to generate the frequency N times greater than the harmonic frequency, a signal input from an input amplifier may respond to the frequency N times greater than the harmonic frequency. In this example, the input signal may respond to an N-th harmonic signal generated by an LC filter configured to resonate at an N-th harmonic frequency of a source node and an oscillation signal having N phases. Since an operation frequency of an oscillator is 1/N times an input frequency of an injection signal input in an RF band, the harmonic SRR may operate at a frequency lower than an RF frequency, and thus have a relatively low power consumption. In addition, the harmonic SRR may increase an isolation between an RF end and an LO end since the input frequency is N times higher than the oscillation frequency.

For example, oscillator cells may include ring and LC-type cells. As shown in FIG. 12, the oscillator cells may form a loop including N stages, and may be connected to one another through a common node A. At the common node A, phases, for example, 360/N, of an output of each oscillator cell may overlap. Accordingly, a frequency N times greater than a frequency of the oscillator may be formed. At the common node, a signal in which an output of an oscillator is multiplied to the frequency N times greater than the harmonic frequency may be output. In one example, in order to increase an output of a signal having the frequency N times greater than the harmonic frequency, an LC load configured to harmonically resonate at the frequency N times greater than the harmonic frequency, for example, $N \times \omega_{OSC}$, may be added. A signal input at an input Gm stage having an input gain may respond to a signal of the frequency N times greater than the harmonic frequency, and obtain a super-regenerative gain.

Figure 13:
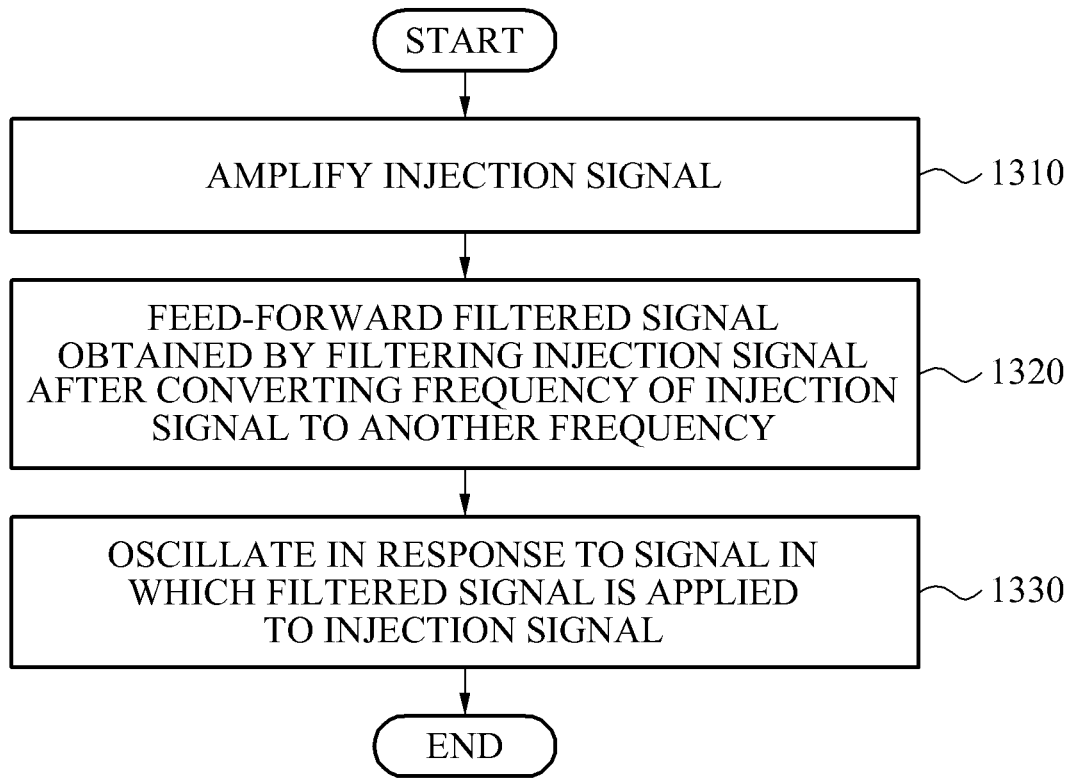
FIG. 13 illustrates an example of a super-regenerative receiving method.

FIG. 13 illustrates an example of a super-regenerative receiving method. Referring to FIG. 13, in operation 1310, an input injection signal is amplified. For example, the injection signal may include a signal transmitted at a frequency located in an RF band.

In operation 1320, a filtered signal obtained by filtering the injection signal after converting a frequency of the injection signal to another frequency is feed-forwarded. A predetermined first frequency of the injection signal may be converted to a predetermined second frequency, the injection signal of the predetermined second frequency may be filtered, and a frequency of the filtered injection signal may be converted to the predetermined first frequency. The predetermined second frequency may be lower than the predetermined first frequency.

Depending on a type of a filter included in a filtering unit, a signal of a predetermined frequency band may be removed from the injection signal of the predetermined second frequency, or a signal of a predetermined frequency band may be passed in the injection signal of the predetermined second frequency. The predetermined frequency band may include an RF band.

In operation 1330, oscillation is performed in response to an input of a signal in which the filtered signal is applied to the injection signal.

In one example, when the signal of the predetermined frequency band is removed from the injection signal of the predetermined second frequency, an oscillator may receive an input of a signal in which the filtered signal is subtracted from the injection signal. When the signal of the predetermined frequency band is passed in the injection signal of the predetermined second frequency, the oscillator may receive an input of a signal in which the filtered signal is added to the injection signal.

In another example, an output signal of the oscillating to be input to a feed-forwarding unit may be delayed for a predetermined time to operate the feed-forwarding unit at a timing identical to a timing of the oscillator.

In another example, interference in the injection signal may be sensed and the filtered signal may be feed-forwarded when a value of the interference is greater than a predetermined value. Since an operation of the feed-forwarding unit may be suspended when interference is absent, power consumption of an SRR may be reduced.

In another example, a filtered in-phase component signal obtained by filtering an in-phase component signal of the injection signal after converting a frequency of the in-phase component signal of the injection signal to another frequency may be feed-forwarded, and a filtered quadrature component signal obtained by filtering a quadrature component signal of the injection signal after converting a frequency of the quadrature component of the injection signal to another frequency may be feed-forwarded.

In addition, the oscillation may be performed in response to an input of a signal in which he filtered in-phase component signal and the filtered quadrature component signal are applied to the injection signal, and an in-phase output signal and a quadrature output signal may be output.

An SRR with a high frequency selectivity in the examples described above may improve an adjacent signal interference phenomenon while maintaining a low-power characteristic. In addition, since a frequency of an oscillation signal is equal to an RF frequency due to a characteristic of a super-regenerative receiving structure, an output signal of the oscillator of the feed-forwarding unit may be used as an LO signal, thereby decreasing a complexity of a circuit.

The various elements illustrated in FIGS. 3-6, 7A, 8-10, 11A, and 12 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

It will be apparent to one of ordinary skill in the art that various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A super-regenerative receiver (SRR) circuit comprising:
   an amplifier configured to amplify an input injection signal and output an amplified injection signal to an oscillator; and
   a feed-forwarding unit configured to feed-forward, to the oscillator, a filtered signal obtained by filtering the input injection signal after converting a frequency of the input injection signal to another frequency;
   wherein the oscillator comprises a super-regenerative oscillator configured to receive an input of a signal and to oscillate using the input of a signal, in which the filtered signal is applied to the amplified injection signal.

2. The SRR circuit of claim 1, wherein the feed-forwarding unit comprises:
   a first frequency converter configured to convert a predetermined first frequency of the input injection signal to a predetermined second frequency;
   a filtering unit configured to filter the input injection signal having the predetermined second frequency; and
   a second frequency converter configured to convert a frequency of the filtered input injection signal to the predetermined first frequency to obtain the filtered signal.

3. The SRR circuit of claim 2, wherein the predetermined second frequency is lower than the predetermined first frequency.

4. The SRR circuit of claim 2, wherein the filtering unit comprises a band-rejection filter configured to remove a signal of a predetermined frequency band from the input injection signal having the predetermined second frequency; and
   the oscillator is further configured to receive, and to oscillate using the input of a signal in which the filtered signal is subtracted from the amplified injection signal.

5. The SRR circuit of claim 2, wherein the filtering unit comprises a bandpass filter configured to pass a signal of a predetermined frequency band in the input injection signal having the predetermined second frequency; and
   the oscillator is configured to receive, and to oscillate using the input of a signal in which the filtered signal is added to the amplified injection signal.

6. The SRR circuit of claim 1, wherein the feed-forwarding unit is further configured to convert the frequency of the input injection signal to the other frequency using a local oscillator (LO) signal.

7. The SRR circuit of claim 1, wherein the feed-forwarding unit is further configured to convert the frequency of the input injection signal to the other frequency using an oscillation signal of the oscillator.

8. The SRR circuit of claim 1, wherein the oscillator comprises a phase delay unit configured to delay, for a predetermined time, an oscillation signal of the oscillator to obtain a delayed oscillation signal; and
   the feed-forwarding unit is further configured to convert the frequency of the input injection signal to the other frequency using the delayed oscillation signal.

9. The SRR circuit of claim 1, further comprising an interference signal discriminator configured to sense interference in the input injection signal, and activate the feed-forwarding unit in response to a value of the interference being greater than a predetermined value.

10. The SRR circuit of claim 1, wherein the feed-forwarding unit comprises:
    an in-phase feed-forwarding unit configured to feed-forward, to the oscillator, a filtered in-phase component signal obtained by filtering an in-phase component signal of the input injection signal after converting a frequency of the in-phase component signal of the input injection signal to another frequency; and
    a quadrature feed-forwarding unit configured to feed-forward, to the oscillator, a filtered quadrature component signal obtained by filtering a quadrature component signal of the input injection signal after converting a frequency of the quadrature component signal of the input injection signal to another frequency; wherein the oscillator is further configured to receive and oscillate using the input of a signal in which the filtered in-phase component signal and the filtered quadrature component signal are applied to the amplified injection signal, and output an in-phase output signal and a quadrature output signal.

11. A super-regenerative receiving method comprising:
    amplifying an input injection signal;
    feed-forwarding a filtered signal obtained by filtering the input injection signal after converting a frequency of the input injection signal to another frequency; and
    oscillating, by a super-regenerative oscillator, in response to an input of a signal in which the filtered signal is applied to the amplified injection signal.

12. The method of claim 11, wherein the feed-forwarding comprises: converting a predetermined first frequency of the input injection signal to a predetermined second frequency; filtering the input injection signal having the predetermined second frequency; and converting a frequency of the filtered injection signal to the predetermined first frequency to obtain the filtered signal.

13. The method of claim 12, wherein the predetermined second frequency is lower than the predetermined first frequency.

14. The method of claim 12, wherein the feed-forwarding comprises removing a signal of a predetermined frequency band from the input injection signal having the predetermined second frequency; and the oscillating comprises receiving the input of a signal in which the filtered signal is subtracted from the amplified injection signal.

15. The method of claim 12, wherein the feed-forwarding comprises passing a signal of a predetermined frequency band in the input injection signal having the predetermined second frequency; and the oscillating comprises receiving the input of a signal in which the filtered signal is added to the amplified injection signal.

16. The method of claim 11, wherein the oscillating comprises delaying, for a predetermined time, an oscillation signal of the oscillating to obtain a delayed oscillation signal; and the feed-forwarding comprises converting the frequency of the input injection signal to the other frequency using the delayed oscillation signal.

17. The method of claim 11, wherein the feed-forwarding comprises sensing interference in the input injection signal; and the feed-forwarding of the filtered signal is performed in response to a value of the interference being greater than a predetermined value.

18. The method of claim 11, wherein the feed-forwarding comprises: feed-forwarding a filtered in-phase component signal obtained by filtering an in-phase component signal of the input injection signal after converting a frequency of the in-phase component signal of the input injection signal to another frequency; and feed-forwarding a quadrature component signal obtained by filtering a quadrature component signal of the input injection signal after converting a frequency of the in-phase component signal of the input injection signal to another frequency; and the oscillating comprises: receiving the input of a signal in which the filtered in-phase component signal and filtered quadrature component signal are applied to the amplified injection signal, and further outputting an in-phase output signal and a quadrature output signal.

19. A super-regenerative receiver (SRR) circuit comprising:
    an amplifier configured to amplify an input injection signal to obtain an amplified injection signal;

a feed-forwarding unit configured to filter the input injection signal at a frequency different from a frequency of the input injection signal to obtain a filtered signal; and an application unit configured to apply the filtered signal to the amplified injection signal to obtain a combined signal, and output the combined signal to an oscillator, wherein the oscillator comprises a super-regenerative oscillator configured to receive the combined signal and to oscillate using the combined signal.

20. The SRR circuit of claim 19, wherein the amplifier comprises the application unit.

21. The SRR circuit of claim 19, wherein the feed-forwarding unit is further configured to filter the input injection signal at a frequency lower than the frequency of the input injection signal, and output the filtered injection signal at a frequency equal to the frequency of the input injection signal.

* * * * *